United States Patent
Weismantel et al.

(10) Patent No.: US 8,138,281 B2
(45) Date of Patent: *Mar. 20, 2012

(54) PRODUCTION OF SUPERABSORBENT POLYMERS ON A CONTINUOUS BELT REACTOR

(75) Inventors: Matthias Weismantel, Jossgrund-Oberndorf (DE); Rüdiger Funk, Niedernhausen (DE); Leigh R. Blair, Greenwood Springs, MS (US); Kevin D. Heitzhaus, Suffolk, VA (US); Bruce Storey, Chesapeake, VA (US)

(73) Assignee: BASF SE, Ludwigshafen (DE)

( * ) Notice: Subject to any disclaimer, the term of this patent is extended or adjusted under 35 U.S.C. 154(b) by 200 days.

This patent is subject to a terminal disclaimer.

(21) Appl. No.: 12/522,109

(22) PCT Filed: Jan. 10, 2008

(86) PCT No.: PCT/EP2008/000129
§ 371 (c)(1),
(2), (4) Date: Jul. 2, 2009

(87) PCT Pub. No.: WO2008/086972
PCT Pub. Date: Jul. 24, 2008

(65) Prior Publication Data
US 2009/0312184 A1    Dec. 17, 2009

Related U.S. Application Data

(60) Provisional application No. 60/880,797, filed on Jan. 16, 2007.

(51) Int. Cl.
*C08F 2/01* (2006.01)

(52) U.S. Cl. .................................. 526/62; 526/317.1
(58) Field of Classification Search .............. 526/62, 526/317.1
See application file for complete search history.

(56) References Cited

U.S. PATENT DOCUMENTS

| | | | |
|---|---|---|---|
| 3,794,155 A | 2/1974 | Bechtel, Jr. | |
| 4,389,357 A * | 6/1983 | Chu et al. | 264/40.1 |
| 4,857,610 A | 8/1989 | Chmelir et al. | |
| 4,893,999 A | 1/1990 | Chmelir et al. | |
| 5,004,761 A | 4/1991 | Yada et al. | |
| 6,241,928 B1 | 6/2001 | Hatsuda et al. | |
| 6,530,469 B2 * | 3/2003 | Messick, Jr. | 198/848 |
| 6,710,141 B1 | 3/2004 | Heide et al. | |
| 2006/0167198 A1 | 7/2006 | Sasabe et al. | |

FOREIGN PATENT DOCUMENTS

DE    35 44 770 A1    6/1987

(Continued)

OTHER PUBLICATIONS

Buchholz et al., *Modern Superabsorbent Polymer Technology*, Wiley-VCH, 71-117 (1998).

(Continued)

*Primary Examiner* — Michael M Bernshteyn
(74) *Attorney, Agent, or Firm* — Marshall, Gerstein & Borun LLP

(57) ABSTRACT

The invention relates to the production of superabsorbent polymers on a continuous belt reactor, wherein the continuous belt rests at least partly upon at least one support belt and the at least one continuous support belt is a metallic belt with a basis weight of at least 1 kg/m$^2$.

19 Claims, 1 Drawing Sheet

FOREIGN PATENT DOCUMENTS

| | | | |
|---|---|---|---|
| DE | 38 25 366 | A1 | 2/1989 |
| DE | 199 28 896 | A1 | 12/2000 |
| DE | 19928896 | A1 * | 12/2000 |
| EP | 0 197 423 | A1 | 10/1986 |
| EP | 197423 | A * | 10/1986 |
| EP | 0 955 086 | A2 | 11/1999 |
| EP | 955086 | A2 * | 11/1999 |
| EP | 1 683 813 | A2 | 7/2006 |
| FR | 2 409 934 | A1 | 6/1979 |
| WO | WO-01/38402 | A1 | 5/2001 |
| WO | WO-2008/086974 | A1 | 7/2008 |
| WO | WO-2008/086975 | A1 | 7/2008 |

OTHER PUBLICATIONS

International Search Report in PCT/EP2008/000129 filed Mar. 25, 2008.

* cited by examiner

PRODUCTION OF SUPERABSORBENT POLYMERS ON A CONTINUOUS BELT REACTOR

CROSS-REFERENCE TO RELATED APPLICATIONS

This is the U.S. national phase of International Application No. PCT/EP2008/000129, filed Jan. 10, 2008, which claims the benefit of U.S. provisional patent Application No. 60/880, 797, filed Jan. 16, 2007, incorporated by reference herein in its entirety.

The present invention relates to a process for production of superabsorbent polymers on a continuous belt reactor, wherein a continuous polymerization belt rests at least partly upon the upper surface of at least one continuous support belt.

Superabsorbent polymers are in particular polymers of (co)polymerized hydrophilic monomers, graft (co)polymers of one or more hydrophilic monomers on a suitable grafting base, crosslinked ethers of cellulose or of starch, crosslinked carboxymethyl-cellulose, partially crosslinked polyalkylene oxide or natural products swellable in aqueous fluids, such as guar derivatives for example. Such polymers are used as products capable of absorbing aqueous solutions to produce diapers, tampons, sanitary napkins and other hygiene articles, but also as water-retaining agents in market gardening.

Superabsorbent polymers typically have a Centrifuge Retention Capacity in the range from 25 to 60 g/g, preferably of at least 30 g/g, more preferably of at least 32 g/g, even more preferably of at least 34 g/g and most preferably of at least 35 g/g. Centrifuge Retention Capacity (CRC) is determined by EDANA (European Disposables and Non-wovens Association) recommended test method No. WSP 241.2-05 "Centrifuge retention capacity".

To improve their performance characteristics, for example permeability, superabsorbent polymeric particles are generally postcrosslinked. This postcrosslinking can be carried out in the aqueous gel phase. Preferably, however, dried, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the superabsorbent polymer particles or capable of crosslinking together carboxyl groups or other functional groups of at least two different polymeric chains of the base polymer.

The production of superabsorbent polymers is described for example in the monograph "Modern Superabsorbent Polymer Technology", F. L. Buchholz and A. T. Graham, Wiley-VCH, 1998, pages 69 to 117.

Kneading reactors or belt reactors are suitable reactors. In a kneader, the polymer gel which is produced in the course of the polymerization of an aqueous monomer solution is for example continuously comminuted by contrarotatory stirring shafts, as described in WO 2001/38402 A1. The polymerization on a belt is described for example in DE 38 25 366 A1 and U.S. Pat. No. 6,241,928. The polymerization in a belt reactor produces a polymer gel which has to be comminuted in a further process step, for example in a meat grinder, extruder or kneader.

DE 35 44 770 A1 describes a continuous belt reactor for the production of superabsorbent polymers.

EP 955 086 A1 discloses a process for polymerization of an aqueous monomer solution on a continuous belt. The change of thickness in the direction of width of the formed polymer gel is maintained to not more than 20%.

EP 1 683 813 A1 describes continuous belt reactors having a fluororesin layer with a low melt viscosity. The fluororesin layer can be laminated on the continuous belt or be fixed on a continuous chain conveyor.

It is an object of the present invention to provide an improved process for production of superabsorbent polymers on a continuous belt reactor.

We have found that this object is achieved by a process for production of superabsorbent polymers on a continuous belt reactor, comprising
i) a continuous polymerization belt and
ii) at least one continuous support belt,
wherein the continuous polymerization belt i) rests at least partly upon the upper surface of the at least one continuous support belt ii) and the at least one continuous support belt ii) is a metallic belt with a basis weight of at least 1 kg/m$^2$.

Figure 1:
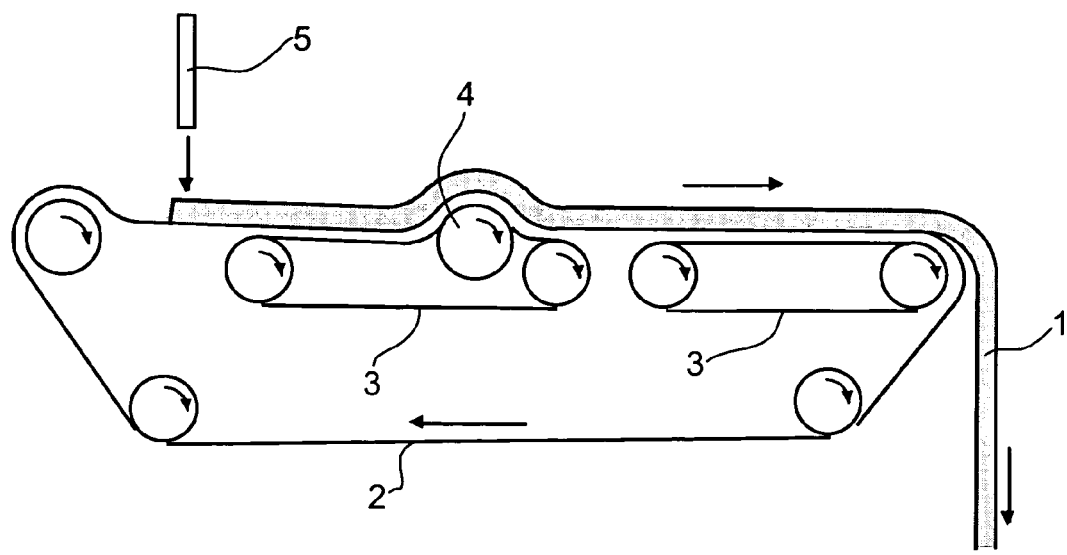
FIG. 1 is a schematic side view of a preferred embodiment of the process of the present invention.
Figure 2:
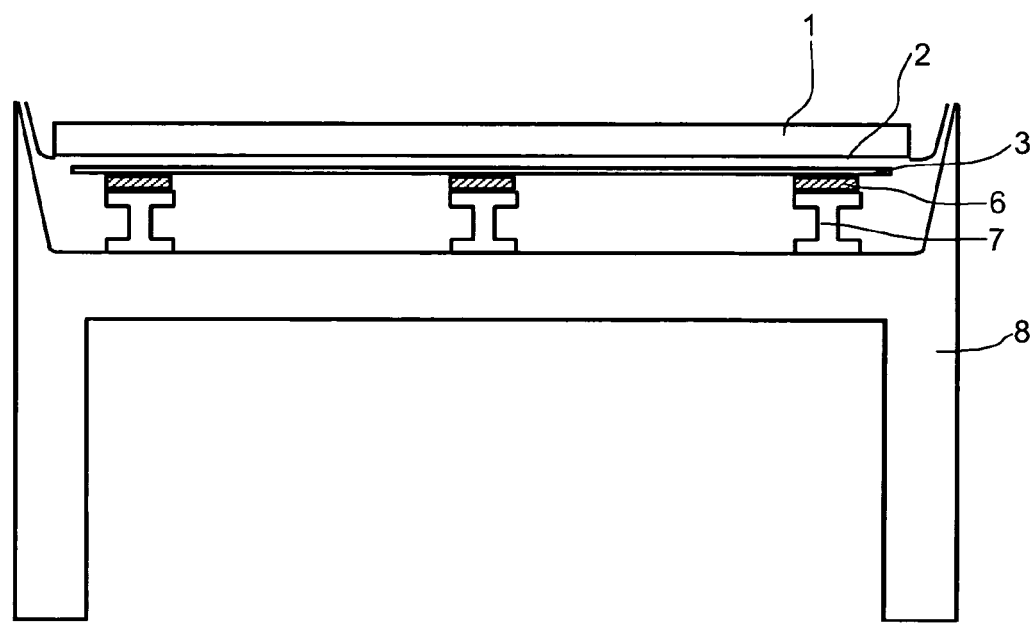
FIG. 2 is a cross-sectional view of a preferred embodiment of the process of the present invention.

The polymerization is an exothermic reaction. The formed polymer gel must be cooled to prevent overheating.

The at least one continuous support belt ii) (3) cools the formed polymer gel (1) by its heat capacity. Therefore, the cooling of the formed hydrogel can be improved by the at least one continuous support belt ii).

Metallic materials have a high heat transfer rate. The basis weight of the at least one continuous support belt ii) is preferably from 3 to 25 kg/m$^2$, more preferably from 5 to 20 kg/m$^2$, most preferably from 7 to 15 kg/m$^2$. The cooling effect of the at least one continuous support belt ii) increases with the basis weight. Too high basis weights of the at least one continuous support belt ii) causes mechanical problems.

Preferably, the at least one continuous support belt ii) have meshes with a mesh size from 6 to 35 mm, more preferably from 9 to 30 mm, most preferably from 12 to 25 mm.

Preferably, the at least one continuous support belt ii) have a thickness from 4 to 35 mm, more preferably from 8 to 30 mm, most preferably from 12 to 25 mm.

In a preferred embodiment of the present invention the at least one continuous support belt ii) is a flat wire belt. U.S. Pat. No. 6,530,469 describes useful flat wire belts. A preferred flat wire belt is PACTITE® Flatwire Belting (Maryland Wire Belts Inc., US).

The strip thickness of the flat wire belt is preferably from 0.6 to 2 mm, more preferably from 0.8 to 1.8 mm, most preferably from 1 to 1.6 mm.

The preferred flat wire belts have a high basis weight and a high surface area. Thus, the flat wire belts have a high heat capacity and a high heat transfer rate to the surrounding airspace.

The continuous support belt ii) can be additionally cooled, preferably with chilled water.

In another preferred embodiment of the present invention the at least one continuous support belt ii) slides at least partly on a fixed surface. A fixed surface is a surface that does not move with the at least one continuous support belt ii).

Preferably less than 20%, more preferably less than 15%, most preferably less than 10%, of the width of the at least one continuous support belt ii) slides on the fixed surface.

Preferably, at least one continuous support belt ii) (3) slides on least one slide bar (7).

The at least one continuous support belt ii) slides preferably on at least two slide bars, more preferably on at least three slide bars, most preferably on at least four slide bars. The slide bars stabilizes the at least one continuous support belt ii) in longitudinal direction. Thus, the tension of the at least one continuous support belt ii) can be reduced.

The upper surface of the slide bars has a friction coefficient of preferably less than 0.5, more preferably less than 0.4, most preferably less than 0.3. It is possible to use slide bars wherein only the upper surface of the slide bars is coated with a material (6) having a low friction coefficient, i.e. polytetrafluoroethylene.

In another preferred embodiment of the present invention the continuous polymerization belt i) comprises a carcass and a cover.

The continuous polymerization belt i) can be made of various materials, although these must meet the requirements of good tensile strength and flexibility, good fatigue strength under repeating bending stresses, good deformability and chemical resistance to the individual reaction components under the conditions of the polymerization. These demands cannot be met by a single material. Therefore, a multi-layer material must be used as continuous polymerization belt i) of the present invention.

The mechanical requirements can be satisfied by a carcass of, for example, fabric inserts of natural and/or synthetic fibers or glass fibers or steel cords.

The chemical resistance can be achieved by a cover of, for example, polyethylene, polypropylene, polyisobutylene, halogenated polyolefines such as polyvinyl chloride or polytetrafluorethylene, polyamides, natural or synthetic rubbers, polyester resins or epoxy resins. The preferred cover material is silicone rubber.

The continuous support belt ii) used in the invention is a metallic belt, preferably a stainless steel belt. Especially metallic continuous support belts ii) can be used under high tensile stress that prevents sagging of the continuous polymerization belt i). Thus, the supported continuous polymerization belt i) shows a reduced sagging compared to the prior art continuous belt reactors using idlers as support means.

Another effect of the inventive process is that the necessary tension of the continuous polymerization belt i) can be reduced. Thus, the continuous polymerization belt i) of the inventive process has a highly improved serviceable life.

Preferably, the continuous polymerization belt i) (2) rests upon at least two continuous support belts ii) (3). The usage of more than one continuous support belt ii) reduces the necessary tension of each continuous support belt ii).

Preferably, the lateral edges of the continuous polymerization belt i) are curved upwardly from the horizontal plane by at least one fixed support means. A fixed support means is a support means that does not move with the continuous polymerization belt i). A fixed support means can be, for example, slide bars that curve the lateral edges of polymerization belt i) upwardly. It is also possible that these slide bars are part of the support construction (8).

Preferably, the first section of the continuous polymerization belt i) (2) is not supported by a continuous support belt ii) (3). Without support of a continuous support belt ii), the first section forms a trough by the weight of the added monomer solution (5).

Additionally, the continuous support belts ii) can be stiffed in transverse direction.

In another preferred embodiment of the present invention at least one continuous support belt ii) forms at the end in downward direction a barrier for liquids. The barrier can be formed by an additional roll (4) that lifts the continuous support belt ii) (3). The barrier prevents that monomer solution can flow into the next production steps on break-down of the polymerization.

The monomer solutions or monomer suspensions usable in the process of the present invention comprises a) at least one ethylenically unsaturated acid-functional monomer,
b) at least one crosslinker,
c) if appropriate one or more ethylenically and/or allylically unsaturated monomers copolymerizable with a), and
d) if appropriate one or more water-soluble polymers onto which the monomers a), b) and if appropriate c) can be at least partly grafted.

Suitable monomers a) are for example ethylenically unsaturated carboxylic acids, such as acrylic acid, methacrylic acid, maleic acid, fumaric acid and itaconic acid and/or salts of these acids. Acrylic acid and methacrylic acid are particularly preferred monomers. Acrylic acid is most preferable.

Useful monomers a) are further styrenesulfonic acid, 2-acrylamido-2-methylpropanesulfonic acid and 2-hydroxyethylacrylate.

The proportion of the total amount of monomers a) which is attributable to acrylic acid and/or its salts is preferably at least 50 mol-%, more preferably at least 90 mol-% and most preferably at least 95 mol-%.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

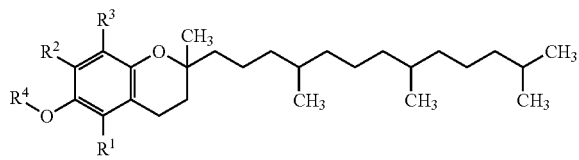

where $R^1$ is hydrogen or methyl, $R^2$ is hydrogen or methyl, $R^3$ is hydrogen or methyl and $R^4$ is hydrogen or an acid radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids. Preference is given to alpha-tocopherol where $R^1=R^2=R^3=$methyl, especially racemic alpha-tocopherol. $R^4$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The superabsorbent polymers are in a crosslinked state, i.e., the polymerization is carried out in the presence of compounds having two or more polymerizable groups which can be free-radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP 530 438 A1, di- and triacrylates as described in EP 547 847 A1, EP 559476 A1, EP 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 10355401 A1, or crosslinker mixtures as described for example in DE 195 43 368 A1, DE 196 46 484 A1, WO 90/15830 A1 and WO 2002/32962 A2.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl(meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP 343 427 A2. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension compared with water at the same temperature (typically not less than 0.068 N/m).

The amount of crosslinker b) is preferably from 0.001 to 10 wt. %, more preferably from 0.01 to 5 wt. % and most preferably from 0.1 to 2 wt. %, all based on monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

The solids content of the monomer solution is preferably at least 30 wt. %, more preferably at least 35 wt. %, most preferably at least 40 wt. %. The solids content is the sum of monomer a), crosslinker b), monomer c) and polymer d). The usage of aqueous monomer suspensions with high solids contents is also possible.

The monomer solution or the monomer suspension is polymerized on continuous polymerization belt i) forming a polymer gel.

The width of the continuous polymerization belt i) is preferably from 1 to 10 m, more preferably from 2 to 8 m, most preferably from 3 to 6 m. The length of the continuous polymerization belt i) is preferably from 3 to 50 m, more preferably from 5 to 40 m, most preferably from 10 to 30 m. The residence time on the continuous polymerization belt i) is preferably from 5 to 120 minutes, more preferably from 10 to 60 minutes, most preferably from 12 to 40 minutes.

The thickness of the formed polymer gel layer is preferably from 1 to 20 cm, more preferable from 2 to 15 cm, most preferable from 5 to 10 cm. Next, the polymer gel is comminuted in a further process step, for example in a meat grinder, extruder or kneader.

The acid groups of the hydrogels obtained are typically in a partially neutralized state, the extent of neutralization preferably being in the range from 25 to 95 mol-%, more preferably in the range from 50 to 80 mol-% and even more preferably in the range from 60 to 75 mol-%, for which the customary neutralizing agents can be used, for example alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof.

Neutralization is preferably carried out at the monomer stage. This is customarily accomplished by admixing the neutralizing agent as an aqueous solution, as a melt or else preferably as a solid material. For example, sodium hydroxide having a water fraction of distinctly below 50% by weight can be present as a waxy mass having a melting point above 23° C. In this case, metering as piece goods or melt at elevated temperature is possible.

Neutralization can also be carried out after polymerization, at the hydrogel stage. But it is also possible to neutralize up to 40 mol-%, preferably from 10 to 30 mol-% and more preferably from 15 to 25 mol-% of the acid groups before polymerization by adding a portion of the neutralizing agent to the monomer solution and setting the desired final degree of neutralization only after polymerization, at the hydrogel stage. When the hydrogel is neutralized at least partly after polymerization, the hydrogel is preferably mechanically comminuted, for example by means of a meat grinder, in which case the neutralizing agent can be sprayed, sprinkled or poured on and then carefully mixed in. To this end, the gel mass obtained can be repeatedly grindered for homogenization. The hydrogel is then preferably dried with a belt dryer until the residual moisture content is preferably below 15% by weight and especially below 10% by weight, the water content being determined by EDANA (European Disposables and Nonwovens Association) recommended test method No. WSP 230.2-05 "Moisture content". Selectively, drying can also be carried out using a fluidized bed dryer or a heated plowshare mixer. To obtain particularly white products, it is advantageous to dry this gel by ensuring rapid removal of the evaporating water. To this end, the dryer temperature must be optimized, the air feed and removal has to be policed, and at all times sufficient venting must be ensured. Drying is naturally all the more simple—and the product all the more white—when the solids content of the gel is as high as possible. The solids content of the gel prior to drying is therefore preferably between 30% and 80% by weight. It is particularly advantageous to vent the dryer with nitrogen or some other non-oxidizing inert gas. Selectively, however, simply just the partial pressure of the oxygen can be lowered during drying to prevent oxidative yellowing processes. But in general adequate venting and removal of the water vapor will likewise still lead to an acceptable product. A very short drying time is generally advantageous with regard to color and product quality.

A further important function of drying the gel is the ongoing reduction in the residual monomer content of the superabsorbent. This is because any residual initiator will decompose during drying, leading to any residual monomers becoming interpolymerized. In addition, the evaporating amounts of water will entrain any free water-vapor-volatile monomers still present, such as acrylic acid for example, and thus likewise lower the residual monomer content of the superabsorbent.

The dried hydrogel is then ground and classified, useful grinding apparatus typically including single or multiple stage roll mills, preferably two or three stage roll mills, pin mills, hammer mills or swing mills.

The polymer obtained may subsequently be postcrosslinked. Useful postcrosslinkers are compounds comprising two or more groups capable of forming covalent bonds with the carboxylate groups of the polymers. Useful compounds are for example alkoxysilyl compounds, polyaziridines, polyamines, polyamidoamines, di- or polyglycidyl compounds as described in EP 83 022 A2, EP 543 303 A1 and EP 937 736 A2, polyhydric alcohols as described in DE 33 14 019 A1, DE 35 23 617 A1 and EP 450 922 A2, or β-hydroxyalkylamides as described in DE 102 04 938 A1 and U.S. Pat. No. 6,239,230. It is also possible to use compounds of mixed functionality, such as glycidol, 3-ethyl-3-oxetanemethanol (trimethylolpropaneoxetane), as described in EP 1 199 327 A2, aminoethanol, diethanolamine, triethanolamine or compounds which develop a further functionality after the first reaction, such as ethylene oxide, propylene oxide, isobutylene oxide, aziridine, azetidine or oxetane.

Useful postcrosslinkers are further said to include by DE 40 20 780 C1 cyclic carbonates, by DE 198 07 502 A1 2-oxazolidone and its derivatives, such as N-(2-hydroxyethyl)-2-oxazolidone, by DE 198 07 992 A1 bis- and poly-2-oxazolidinones, by DE 198 54 573 A2 2-oxotetrahydro-1,3-oxazine and its derivatives, by DE 198 54 574 A1 N-acyl-2-oxazolidones, by DE 102 04 937 A1 cyclic ureas, by DE 103 34 584 A1 bicyclic amide acetals, by EP 1 199 327 A2 oxetanes and cyclic ureas and by WO 2003/31482 A1 morpholine-2,3-dione and its derivatives.

Preferred postcrosslinkers are oxazolidone and its derivatives, in particular N-(2-hydroxyethyl)-2-oxazolidone, glycidyl compounds, in particular ethylene glycol diglycidyl ether, polyols, in particular glycerol, and ethylene carbonate.

The amount of postcrosslinker is preferably in the range from 0.001% to 5% by weight, more preferably in the range from 0.01% to 2.5% by weight and most preferably in the range from 0.1% to 1% by weight, all based on the polymer.

Postcrosslinking is customarily carried out by spraying the hydrogel or the dry polymeric particles with a solution, preferably an aqueous solution, of the postcrosslinker. Spraying is followed by thermal drying, and the postcrosslinking reaction can take place not only before but also during drying.

The postcrosslinker is advantageously mixed with the polymer by the process of the present invention and subsequently thermally dried.

Contact dryers are preferable, shovel dryers more preferable and disk dryers most preferable as apparatus in which thermal drying is carried out. Suitable dryers include for example Bepex® dryers and Nara® dryers. Fluidized bed dryers can be used as well.

Drying can take place in the mixer itself, by heating the shell or blowing warm air into it. It is similarly possible to use a downstream dryer, for example a tray dryer, a rotary tube oven or a heatable screw. But it is also possible for example to utilize an azeotropic distillation as a drying process.

Preferred drying temperatures range from 50 to 250° C., preferably from 50 to 200° C., and more preferably from 50 to 150° C. The preferred residence time at this temperature in the reaction mixer or dryer is below 30 minutes and more preferably below 10 minutes.

The present invention provides an improved process for production of superabsorbent polymers of uniform quality and low maintenance costs in a large scale on a continuous belt reactor. Due to the improved cooling during the polymerization polymers with an increased degree of polymerization can be produced.

We claim:

1. A process for production of superabsorbent polymers on a continuous belt reactor, comprising
   i) a continuous polymerization belt and
   ii) at least one continuous support belt,
wherein the continuous polymerization belt i) rests at least partly upon an upper surface of the at least one continuous support belt ii) and the at least one continuous support belt ii) is a metallic belt with a basis weight of at least 1 kg/m², wherein the at least one continuous support belt ii) is a flat wire belt.

2. The process according to claim 1 wherein the at least one continuous support belt ii) has meshes with a mesh size of at least 6 mm.

3. The process according to claim 1 wherein the at least one continuous support belt ii) has a thickness of at least 4 mm.

4. The process according to claim 1 wherein the at least one continuous support belt ii) is a flat wire belt with a strip thickness of less than 2 mm.

5. The process according to claim 1 wherein the at least one continuous support belt ii) slides at least partly on a fixed surface.

6. The process according to claim 5 wherein less than 20% of a width of the at least one continuous support belt ii) slides on the fixed surface.

7. The process according to claim 6 wherein the fixed surface is at least one slide bar.

8. The process according to claim 7 wherein an upper surface of the slide bar is at least partly coated with a material having a friction coefficient of less than 0.5.

9. The process according to claim 8 wherein the coating material is polytetrafluoroethylene.

10. The process according to claim 1 wherein the continuous polymerization belt i) comprises a carcass and a cover.

11. The process according to claim 1 wherein the continuous polymerization belt i) rests upon at least two continuous support belts ii).

12. The process according to claim 1 wherein lateral edges of the continuous polymerization belt i) are curved upwardly from a horizontal plane by at least one fixed support means.

13. The process according to claim 1 wherein a first section of the continuous polymerization belt i) forms a trough.

14. The process according to claim 1 wherein the at least one continuous support belt ii) is stiffed in transverse direction.

15. The process according to claim 1 wherein the at least one continuous support belt ii) forms at an end in downward direction a barrier for liquids.

16. The process according to claim 1 wherein a monomer that is processed on the continuous belt reactor is at least 50 wt. % acrylic acid and/or a salt thereof.

17. The process according to claim 1 wherein the basis weight of the at least one continuous support belt is from 3 to 25 kg/m$^2$.

18. The process according to claim 1 wherein the basis weight of the at least one continuous support belt is from 5 to 25 kg/m$^2$.

19. The process according to claim 1 wherein the basis weight of the at least one continuous support belt is from 7 to 25 kg/m$^2$.

\* \* \* \* \*